US007834762B2

(12) United States Patent
Danvir et al.

(10) Patent No.: US 7,834,762 B2
(45) Date of Patent: Nov. 16, 2010

(54) MONITORING FOR RADIO FREQUENCY ENABLED ITEMS BASED ON ACTIVITY PROFILES (75) Inventors: Janice M. Danvir, Arlington Heights, IL (US); Krishna D. Jonnalagadda, Algonquin, IL (US); Francesca Schuler, Des Plaines, IL (US)

(73) Assignee: Motorola, Inc., Schaumburg, IL (US)

( * ) Notice: Subject to any disclaimer, the term of this patent is extended or adjusted under 35 U.S.C. 154(b) by 183 days.

(21) Appl. No.: 11/616,621

(22) Filed: Dec. 27, 2006

(65) Prior Publication Data
US 2008/0157966 A1 Jul. 3, 2008

(51) Int. Cl.
*G08B 13/14* (2006.01)
(52) U.S. Cl. .............. 340/572.1; 340/573.1; 340/568.1; 340/686.6; 340/10.1; 340/10.4; 340/5.1; 340/825.49; 705/3; 705/16; 705/17; 705/18; 705/67
(58) Field of Classification Search ............. 340/572.1, 340/573.1, 568.1, 5.61, 10.1, 5.2, 686.6, 340/10.4; 705/1, 3, 14, 18, 67, 962, 10, 16, 705/17; 600/300, 301; 707/102, 104.1; 455/73, 455/403, 121; 700/236; 902/22; 482/1, 482/8; 128/903, 904, 920; 235/375, 383, 235/385, 462.45
See application file for complete search history.

(56) References Cited

U.S. PATENT DOCUMENTS

| | | | | |
|---|---|---|---|---|
| 5,979,757 | A * | 11/1999 | Tracy et al. | 235/383 |
| 6,108,685 | A * | 8/2000 | Kutzik et al. | 709/200 |
| 6,375,077 | B1 * | 4/2002 | Hankins | 235/462.45 |
| 6,424,264 | B1 | 7/2002 | Giraldin et al. | |
| 6,602,191 | B2 * | 8/2003 | Quy | 600/300 |
| 6,605,038 | B1 * | 8/2003 | Teller et al. | 600/300 |
| 6,774,811 | B2 | 8/2004 | Kaufman et al. | |
| 7,140,542 | B2 * | 11/2006 | Andreasson et al. | 235/385 |

(Continued)

FOREIGN PATENT DOCUMENTS

EP  1 522 949 A1  4/2005

(Continued)

OTHER PUBLICATIONS

Bradbury, Dumbing Down A Smartwatch, Wired News, Nov. 29, 2004, http://www.wired.com/news/technology/0,1282,65721,00.html.

(Continued)

*Primary Examiner*—George A Bugg
*Assistant Examiner*—Sisay Yacob (57) ABSTRACT

A method, wireless communication device, and radio frequency ID reader are provided for monitoring radio-frequency identification enabled items. The method includes receiving a set of radio frequency IDs (1104) representing a set of radio frequency ID enabled items (110) to be monitored. An identifier representing a user activity and its relationship with at least one radio frequency ID in the set of radio frequency IDs and at least one radio frequency ID reader is received (1106). The method also includes determining if at least one condition associated with the user activity has occurred indicating that the user activity is occurring (1108). The set of radio frequency IDs representing a set of radio frequency ID enabled items (110) to be monitored by the at least one radio frequency ID reader are monitored (1110) in response to the determining that the at least one condition is occurring.

20 Claims, 9 Drawing Sheets

U.S. PATENT DOCUMENTS

| | | |
|---|---|---|
| 7,295,116 B2 | 11/2007 | Kumar et al. |
| 2002/0019586 A1* | 2/2002 | Teller et al. .................. 600/300 |
| 2002/0079368 A1* | 6/2002 | Hankins ...................... 235/383 |
| 2002/0147629 A1* | 10/2002 | Alsafadi et al. ............... 705/10 |
| 2004/0073482 A1* | 4/2004 | Wiggins et al. ............... 705/14 |
| 2004/0185881 A1 | 9/2004 | Lee et al. |
| 2004/0198555 A1* | 10/2004 | Anderson et al. .............. 482/8 |
| 2005/0065971 A1 | 3/2005 | Honda |
| 2005/0093698 A1* | 5/2005 | Sakamoto et al. ........ 340/572.1 |
| 2005/0216126 A1 | 9/2005 | Koselka et al. |
| 2005/0250458 A1* | 11/2005 | Graham et al. ............. 455/121 |
| 2005/0285739 A1* | 12/2005 | Velhal et al. ............. 340/572.1 |
| 2006/0205359 A1* | 9/2006 | Brooks ........................ 455/73 |
| 2006/0205564 A1* | 9/2006 | Peterson ........................ 482/8 |
| 2006/0229504 A1* | 10/2006 | Johnson, Jr. ................. 600/300 |
| 2007/0257768 A1* | 11/2007 | Bowers et al. ............. 340/5.61 |

FOREIGN PATENT DOCUMENTS

| | | |
|---|---|---|
| JP | 2004-258914 A | 9/2004 |
| JP | 2007-004615 A | 1/2007 |
| KR | 10-0706914 B1 | 4/2007 |

OTHER PUBLICATIONS

Vigoda & Gershenfeld, TouchTags: Using Touch to Retrieve Information Stored in a Physical Object, MIT, 2 pages, http://www.media.mit.edu/physics/publications/papers/99.01touchtag.rtf.

Tagalert help you keep track of personal stuff, RFID Gazette (Journal), Mar. 20, 2006.

International Search Report dated Jun. 26, 2008 for PCT/US07/83064.

* cited by examiner

MONITORING FOR RADIO FREQUENCY ENABLED ITEMS BASED ON ACTIVITY PROFILES

CROSS-REFERENCE TO RELATED APPLICATIONS

This application is related to applications entitled "Dynamic Updating Of Product Profiles For Active Lifestyles," U.S. patent application Ser. No. 11/616,645, and "Active Lifestyle Management", U.S. patent application Ser. No. 11/616,636, which were filed on the same day as the present application and commonly assigned herewith to Motorola, Inc. These related applications are incorporated herein by reference in their entirety.

FIELD OF THE INVENTION

The present invention generally relates to the field of radio frequency identification, and more particularly relates to monitoring for radio frequency enabled items and activities.

BACKGROUND OF THE INVENTION

Radio frequency identification ("RFID") is used to automatically identify and track RFID enabled items. RFID systems utilize RFID tags that are placed on the object to be monitored. For example, a shipping company can place RFID tags on its boxes to monitor and identify each box. One problem with some current RFID systems is that the RFID reader, the device that receives radio frequency ("RF") signals from the RFID tags, needs to be carried by the user. If a user forgets the RFID reader, the tracking benefits of the RFID system are lost.

Other RFID systems utilize stationary RFID readers. In these systems the readers are generally setup to generate an audible alarm when a reader detects an RFID tag. These systems cannot notify a user if an item has be forgotten or left behind. Furthermore, current RFID systems are constantly monitoring for RFID enabled items. In other words, current RFID systems do not allow a user to customize the monitoring of RFID. The constant monitoring unnecessarily wastes battery life of the RFID reader.

Therefore a need exists to overcome the problems with the prior art as discussed above.

SUMMARY OF THE INVENTION

Briefly, in accordance with the present invention, disclosed are a method, wireless communication device, and RFID reader for monitoring radio-frequency identification enabled items. The method includes receiving a set of radio frequency IDs representing a set of radio frequency ID enabled items to be monitored. An identifier representing a user activity and its relationship with at least one radio frequency ID in the set of radio frequency IDs and at least one radio frequency ID reader is received. The method also includes determining if at least one condition associated with the user activity has occurred indicating that the user activity is occurring. The set of radio frequency IDs representing a set of radio frequency ID enabled items to be monitored by the at least one radio frequency ID reader are monitored in response to the determining that the at least one condition is occurring.

In another embodiment, a wireless communication device for monitoring radio-frequency identification enabled items is disclosed. The wireless communication device includes a memory and a processor that is communicatively coupled to the memory. The wireless communication device also includes a radio frequency ID monitoring module that is communicatively coupled to the memory and the processor. The radio frequency ID monitoring module is for receiving a set of radio frequency IDs representing a set of radio frequency ID enabled items to be monitored. An identifier representing a user activity and its relationship with at least one radio frequency ID in the set of radio frequency IDs and at least one radio frequency ID reader is received. The radio frequency ID monitoring module is also for determining if at least one condition associated with the user activity has occurred indicating that the user activity is occurring. The set of radio frequency IDs representing a set of radio frequency ID enabled items to be monitored by the at least one radio frequency ID reader are monitored in response to the determining that the at least one condition is occurring.

In yet another embodiment, a radio frequency ID reader for monitoring radio-frequency identification enabled items is disclosed. The radio frequency ID reader includes a memory and a processor that is communicatively coupled to the memory. The radio frequency ID reader also includes a radio frequency ID monitoring module that is communicatively coupled to the memory and the processor. The radio frequency ID monitoring module is for receiving a set of radio frequency IDs representing a set of radio frequency ID enabled items to be monitored. An identifier representing a user activity and its relationship with at least one radio frequency ID in the set of radio frequency IDs and at least one radio frequency ID reader is received. The radio frequency ID monitoring module is also for determining if at least one condition associated with the user activity has occurred indicating that the user activity is occurring. The set of radio frequency IDs representing a set of radio frequency ID enabled items to be monitored by the at least one radio frequency ID reader are monitored in response to the determining that the at least one condition is occurring.

One of the advantages of the present invention is that a user is notified on his/her wireless communication device when one or more radio frequency enabled items is missing or has been detected. The present invention allows a user to create activity profiles that are associated with one or more radio frequency enabled items. When the start of an activity has been detected one or more RFID readers associated with the activity begin monitoring for associated radio frequency enabled items. This allows a user to track radio frequency enabled items based on associated activities. In other words, only the radio frequency enabled items that a user wants monitored are monitored, as compared to monitoring every radio frequency enabled item that is detected. This provides a more customizable monitoring environment for a user.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Wireless Communications System

Figure 1:
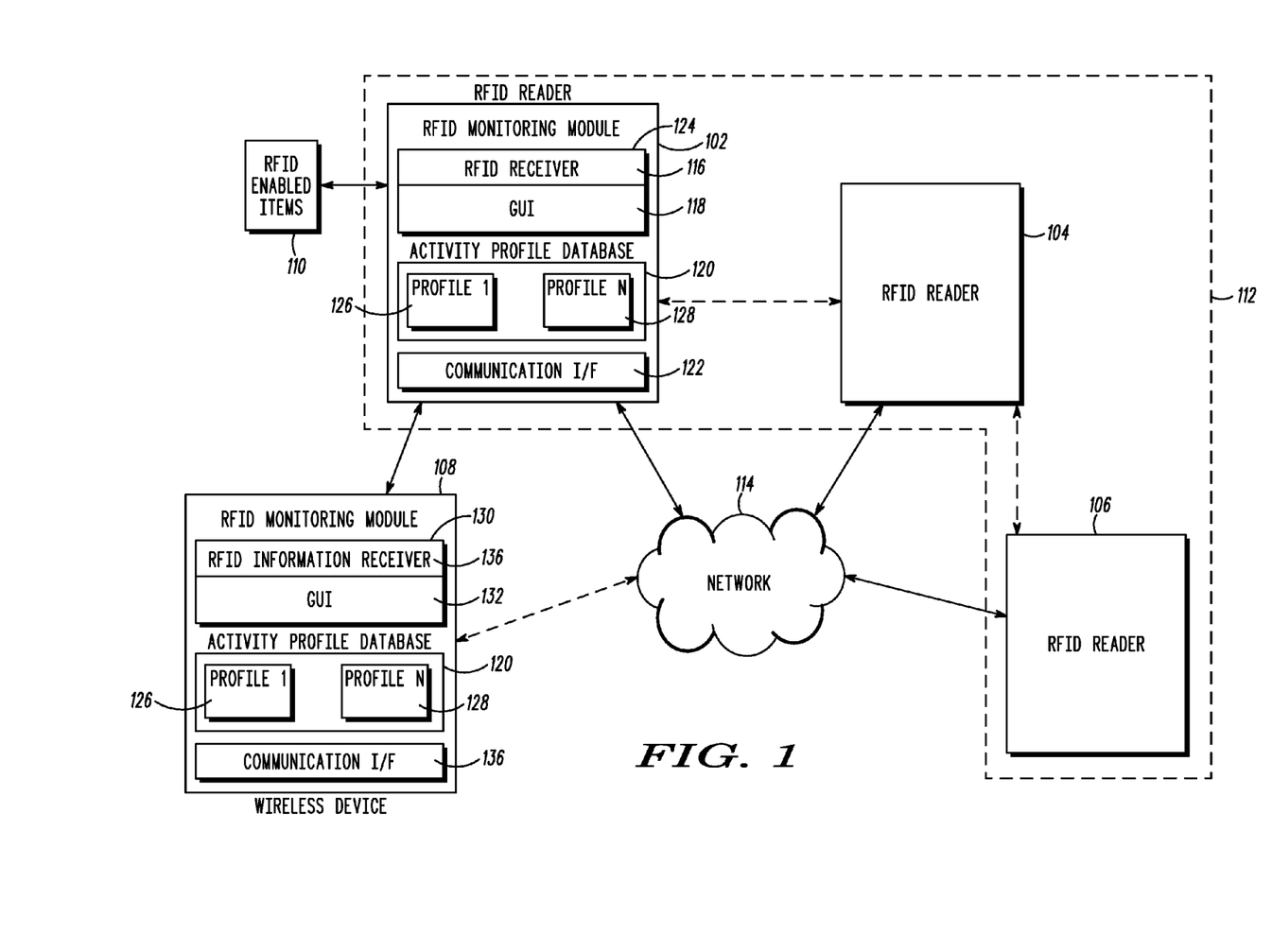
FIG. 1 is a block diagram illustrating a RFID system according to an embodiment of the present invention.

FIG. 1 illustrates one example of an RFID system 100 for tracking RFID enabled items according to an embodiment of the present invention. The RFID system 100 includes one or more RFID readers 102, 104, 106 communicatively coupled to one or more wireless devices 108. The RFID readers 102 detect the presence of one or more RFID enabled items 110, which is any item coupled to an RFID tag. In one embodiment, the RFID readers 102 comprise a distributed network 112 of RFID readers. In other words, the RFID readers 102 communicate information relating to RFID enabled items 110, activity profiles 126, 128, and the like between one another. In another embodiment, each RFID reader 102 acts independent of other RFID readers 102.

The RFID readers 102, in one example, are communicatively coupled to each other via a network 114, which can either be wired (e.g., Ethernet or the like) or wireless (e.g., 802.11, 802.16 or the like). In another embodiment, the RFID readers 102 communicate directly with each other through a direct communication technology such as Bluetooth, Infrared Data Access ("IrDA") technologies, RF, or the like. The RFID readers 102 can be fixed at any location desired by a user. For example, a user may have an RFID reader 110 situated at doorway, in a car, in an office, in a briefcase, or any other place that a user desires.

The wireless device 108, in one example, is communicatively coupled to the RFID readers 102 via the network 114. In another example, the wireless device 108 communicates directly with each RFID reader 102 through a direct communication technology such as Bluetooth, Infrared Data Access ("IrDA") technologies, RF, or the like.

A wireless device, for example, and not for any limitation, can include any one or a combination of the following: mobile telephones, smart phones, text messaging devices, handheld computers, pagers, beepers, wireless communication cards, or the like. A smart phone is a combination of 1) a pocket PC, handheld PC, palm top PC, or Personal Digital Assistant (PDA), and 2) a mobile telephone. More generally, a smartphone. It should be noted that other electronic devices such as an information center (e.g., car radio) within a car can also be communicatively coupled to the RFID readers 102 for displaying information related to RFID enabled items 110.

The RFID system 100 allows for the tracking and monitoring of RFID enabled items 110 with respect to various activities. For example, RFID enabled items 110 can be associated with an activity, wherein the RFID readers 102 detect if all items associated with that activity are present. In one embodiment, each RFID reader 102 includes an RFID monitoring module 124, activity profile database 120, and a communication interface 122. The RFID monitoring module 124 includes an RFID receiver 116, which includes all hardware and software components for detecting RFID enabled items 110 as should be known to those of ordinary skill in the art.

The RFID monitoring module 124 also includes a GUI 118 that provides a user interface for displaying information associated with detected RFID enabled items 110. For example, the GUI 118 can display an identifier associated with the detected item. The GUI 118 also allows a user to enter information associated with RFID enabled items 110 at the RFID reader 102. For example, a user can associate RFID items 110 with specific activities such as leaving for work, vacation, camping, a sporting event, and the like through the GUI 118. Also, a single event can have more than one profile associated with it. It should be noted that the GUI 118 is optional and not every RFID reader 102 needs to include a GUI. The GUI 118 is discussed in greater detail below.

The activity profile database 120 includes one or more profiles 126, 128 associated with an activity for which RFID enable items 110 are to be monitored. For example, a user can define a profile for an activity such as camping that includes various items such as a tent, canteen, lantern, and the like. As the RFID reader 102 begins monitoring items for the "camping" activity, it cross references the profile with detected items to determine if all items are present.

The RFID reader 102 can then alert a user if all items associated with the activity are present or if items are missing. This information can be displayed to a user through the GUI 118 of the RFID reader 102 or sent to the wireless device 108 via the communication interface 122. Additionally, a profile 126 can also include an identifier for one or more RFID readers 102 that are to monitor a particular activity and/or items. For example, a user can designate an RFID reader 102 situated in a trunk of a car or in a garage to monitor for "camping" activity items.

The wireless device 108, in one embodiment, includes an RFID information module 130 comprising an RFID information receiver 136 for receiving RFID related information from a RFID reader 102. For example, a wireless device 108 can receive activity profiles 126 from the RFID reader 102, item list updates, prompts, and the like. The information is received via a communication interface 134 such as Bluetooth of IrDA, as discussed above. The received information is displayed to the user via a GUI 132. The user can also enter information associated with RFID enabled items 110 through the GUI 132. For example, a user can enter profile information, RFID identifier information and the like through the wireless device GUI 132. Any information displayed to a user at an RFID reader 102 can also be displayed to a user at the wireless device through the wireless device GUI 132.

The wireless device 108 can also include an RFID monitoring module that monitors for RFID enabled items similar to that discussed above with respect to the RFID reader 102. The RFID monitoring module, in this example, can also include the RFID information module 130. It should be noted that the activity profile database 120 can reside on a remote system (not shown) instead of at the RFID reader 102. In this example, the RFID reader 102 syncs with the remote system to retrieve activity profiles. Also, each RFID reader 102 in the RFID system 100 can include an activity profile database 120 or a single RFID reader 102 can include a central activity profile database 120 used by all coupled RFID readers 102. In yet another example, the activity profiles 126 can reside on the wireless device 108 and be transmitted to any of the RFID readers 102. The activity profiles 126 are discussed in greater detail below.

In another example, an activity profile 126 does not need to be predefined. For example, an RFID reader 102 can detect one or more RFID enabled items 110 and prompt a user to create an activity profile with the detected items. This prompting can occur at the RFID reader 102 or the RFID reader 102 can prompt the user through the GUI 132 of the wireless device 108.

The following is one example illustrating RFID monitoring according to the present invention. It should be noted that these example are only illustrative and do not limit the present invention in any way. The present invention is applicable to any environment where a user desires to monitor for RFID enabled items.

In this example, a user has an RFID reader 102 located in the trunk of his/her automobile. The monitoring of RFID enabled items 110 can be triggered in various ways. For example, the RFID reader 102 can continually monitor for RFID enabled items 110 or a user can manually start the monitoring at an RFID reader 102. Alternatively, the RFID reader 102 can start monitoring based on an external event such as the car moving, ignition starting, or a calendar event occurring. For example, the RFID reader 102 can include an internal clock which is monitored by the RFID monitoring module 124. An activity profile 126 can be associated with specific dates and/or time intervals, and based on this information, the RFID reader 102 can start monitoring. For example, if a user has setup a "camping" profile associated with Oct. 10, 2006 at 7:00 am, the RFID reader 102 can starting monitoring for the items 110 associated with the "camping" profile on Oct. 10, 2006 at 7:00 am.

As the user packs the car, the RFID reader 102 detects the RFID enabled items 110 and updates a detection list, which is a list of items that has entered and/or exited the trunk of the car. The RFID reader 102 can also update a detection list at the wireless device 108. For example, as items are detected entering or exiting the trunk, a list on the RFID reader 102 and/or the wireless device can display the name of the item entering or exiting. This list can be displayed in real-time or displayed at given intervals.

Also, if the RFID reader 102 detects an RFID enabled item 110 that is not associated with a currently monitored for activity profile or if a profile is currently not being for, the RFID reader 102 cross-references its profile database 120 to determine if an activity profile 126 is associated with the detected item(s) 110. If an activity profile 126 is associated with the detected item(s) 110, the RFID reader 102 can automatically start monitoring for all the items in the profile 126. In another embodiment, the RFID reader 102 can prompt the user either though its own interface 118 of the interface 132 of the wireless device 108 to determine if it should start monitoring for all the items in the profile 126.

Additionally, the user can query the RFID reader 102 either through the wireless device 108 or the RFID reader 102 for a status update of the detected items 110. For example, the list of detected items can be displayed to the user. Alternatively, with respect to the above example, a list of items that have exited the trunk can also be displayed. After the RFID reader 102 has completed monitoring RFID enabled items 110, a final list of detected items can be displayed to the user. It should be noted that this list can display all detected items and/or missing items (when a profile was being monitored for). The RFID reader 102 can determine when to finish monitoring either by determining that all items in a profile have been detected, by being manually stopped by a user, or detecting an external event such as the trunk closing or the car ignition starting (in the above example). These external events can also trigger a status update to be sent to the wireless device 108 or displayed at the RFID reader 102. For example, in the above example, if the RFID reader 102 detects that the car has been started, the list of detected or missing items can be displayed to the user.

As stated above, the activity profile does not have to be predefined. For example, a user may not have created a camping profile, but wants the RFID reader 102 to keep track of what items the user is bringing on the camping trip. The user can have the RFID reader 102 keep track of the items placed in the trunk and define an activity profile based on those items. The user can interact with the RFID reader 102 via the GUI 118 of the RFID reader 102 of through the GUI 132 of the wireless device 108. The RFID reader 102 can also determine that an activity profile is not associated with the detected items 110 and prompt the user to determine whether or not to pace these detected items into an activity profile. If the user creates a profile at the RFID reader 102 as compared to using the wireless device 108, the newly created profile along with associated item identifiers are sent to the wireless device 108. When the user leaves the camp site, the RFID reader 102 determines if all of the items within the activity profile are present and alerts the user accordingly. It should be noted that the present invention is not limited to notifying the user via the RFID reader 102 or the wireless device 108. For example, other electronic devices such as a car information center (e.g., car radio, dashboard display), PDA, watch, and the like can also be configured to display the RFID related information.

Additional non-limiting examples are as follows. An RFID reader 102 can be located at a front door of a house and/or at a door leading into a garage. A user can create an activity profile 126 called "LEAVE FOR WORK" at each reader 102 including the items "wallet" and "keys". In one embodiment, the profile 126 can be created at one RFID reader 102, which then communicates the profile 126 to the other RFID reader. As a user walks through each door either to garage or outside the house, the corresponding RFID reader 102 determines if the user has his/her wallet/purse and keys. The RFID reader 102 can then update the wireless device 108 of the user to notify the user if he/she has all of the items. Alternatively, each RFID reader 102 can include profiles for different users or profiles associated with different time intervals. For example, one profile 126 can state that between the hours of 6:00 am and 9:00 a.m., monitor for wallet, keys, and briefcase. Another profile or the same profile can state between the hours of 9:01 a.m. and 5:59 a.m. monitor for wallet and keys.

User Interfaces

Figure 2:
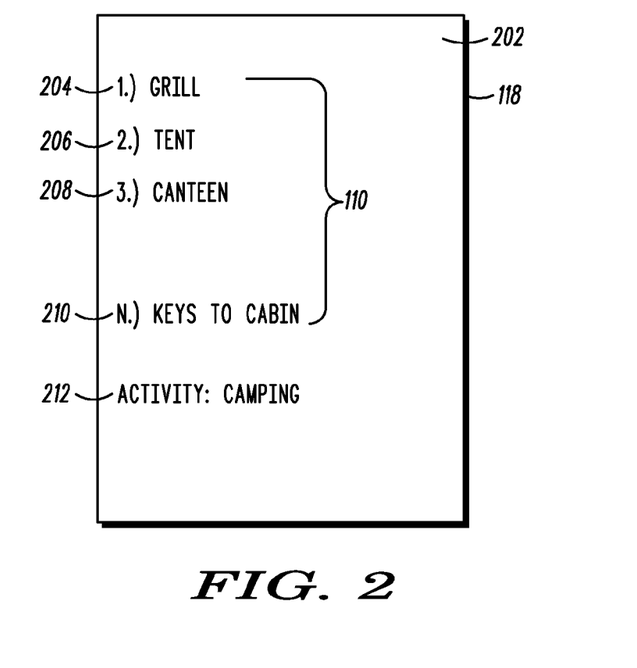
FIG. 2 shows one example of an RFID user interface according to an embodiment of the present invention.

FIGS. 2-5 are block diagrams illustrating graphical user interfaces 118, 132 according to one or more embodiments of the present invention. In particular, FIGS. 2-5 show the GUI 118 of the RFID reader 102. However, the following discussion is also applicable to the GUI 132 of the wireless device 108. FIG. 2 shows the GUI 118 having a display area 202 comprising detected RFID enabled items 110. For example, FIG. 2 shows that an RFID enabled item 204 labeled "grill" has, an RFID item 206 labeled "tent", an RFID enabled item 208 labeled "canteen", and an RFID enabled item 210 labeled "keys to cabin" have been detected. The GUI 118 also displays to activity 212 associated with these items. In this example of FIG. 2 the activity is "Camping".

Figure 3:
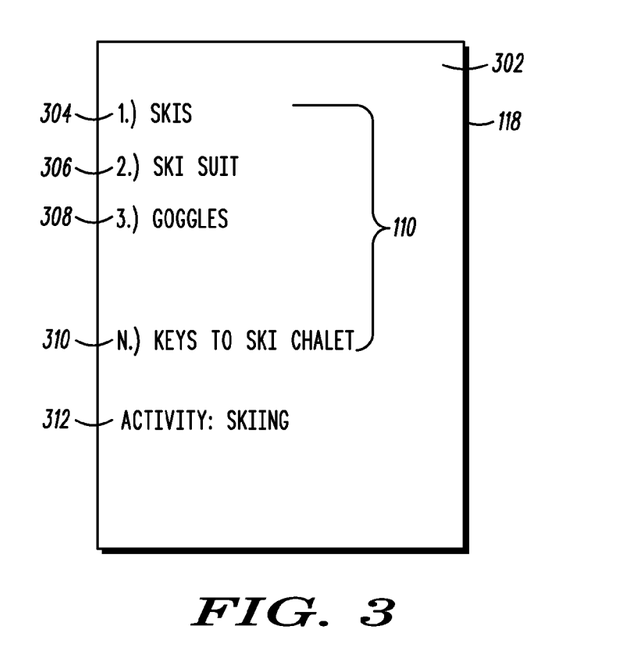
FIG. 3 shows another example of an RFID user interface according to an embodiment of the present invention.

FIG. 3 illustrates another example of the GUI 118 displaying detected RFID enabled items 110 associated with a different activity. FIG. 3 shows the GUI 118 having a display area 302 comprising detected RFID enabled items 110. For example, FIG. 3 shows that an RFID enabled item 304 labeled "skis" has, an RFID item 306 labeled "ski suit", an RFID enabled item 308 labeled "goggles", and an RFID enabled item 310 labeled "keys to ski chalet" have been detected. The GUI 118 also displays to activity 312 associated with these items. In this example of FIG. 2 the activity is "Skiing".

Figure 4:
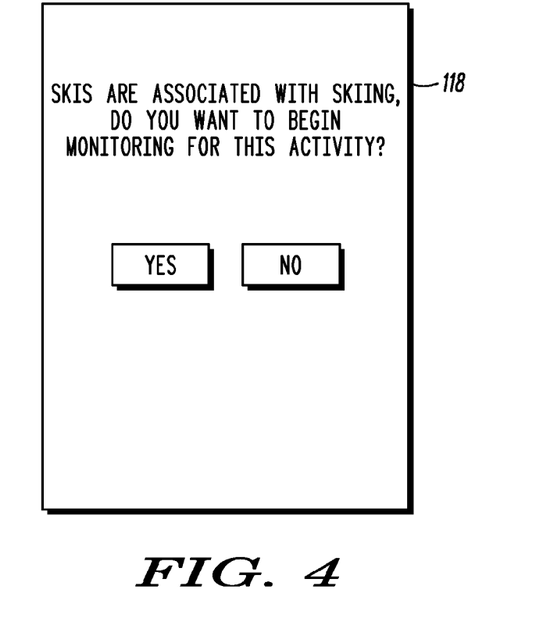
FIG. 4 shows yet another example of an RFID user interface according to an embodiment of the present invention.

In the example of FIG. 3, the RFID reader 102 has not started monitoring for the activity "Skiing". When the first item, skis 304, in the activity "Skiing" has been detected, the RFID reader 102 cross references the item skis 304 to determine the activity it is associated with. FIG. 4 shows the GUI 118 as prompting the user that the item "skis" 304 has been detected and it is associated with the activity "Skiing". The GUI 118 of FIG. 4 asks the user if monitoring for the activity "Skiing" should begin. The user is presented with the option of starting the monitoring process or declining monitoring for the activity. The user can also be prompted via the GUI 132 of the wireless device. In one embodiment, the monitoring starts automatically once the first item or a given number of items associated with an activity has been detected.

Figure 5:
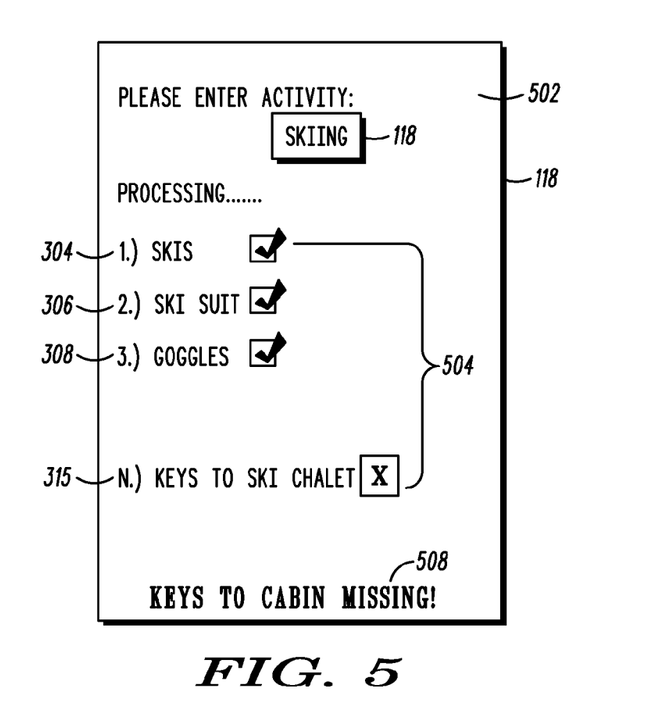
FIG. 5 shows an RFID user interface for notifying a user of detected/missing items according to an embodiment of the present invention.

FIG. 5 shows another example of the GUI 118 of the RFID reader 102. In particular, the GUI 118 of FIG. includes a display area 502 that shows a user a detection or status list 504. In the example of FIG. 5, a user can enter an activity into an input box 506. The corresponding list 504 is then displayed. In another embodiment the list 504 is displayed after a monitoring event has occurred or an external trigger has been detected, as discussed above. FIG. 5 shows that the items "skis" 304, "ski suit" 306, and "goggles" 308 have been detected. The items "keys to the ski chalet" 310 have not been detected. Therefore, a message 508 is displayed alerting the user that the keys to the chalet are missing. It should be noted that the above GUI examples are only illustrative and can be displayed either on the RFID reader GUI 118 or the wireless device GUI 132.

It should be noted that audible information associated with an activity, RFID enabled items, and the like can also be provided to a user separately or in conjunction with information displayed on a user interface. An RFID reader 102 and/or a wireless communication device 108 can each present audible information associated with the monitoring of RFID enabled items.

Exemplary Wireless Device

Figure 6:
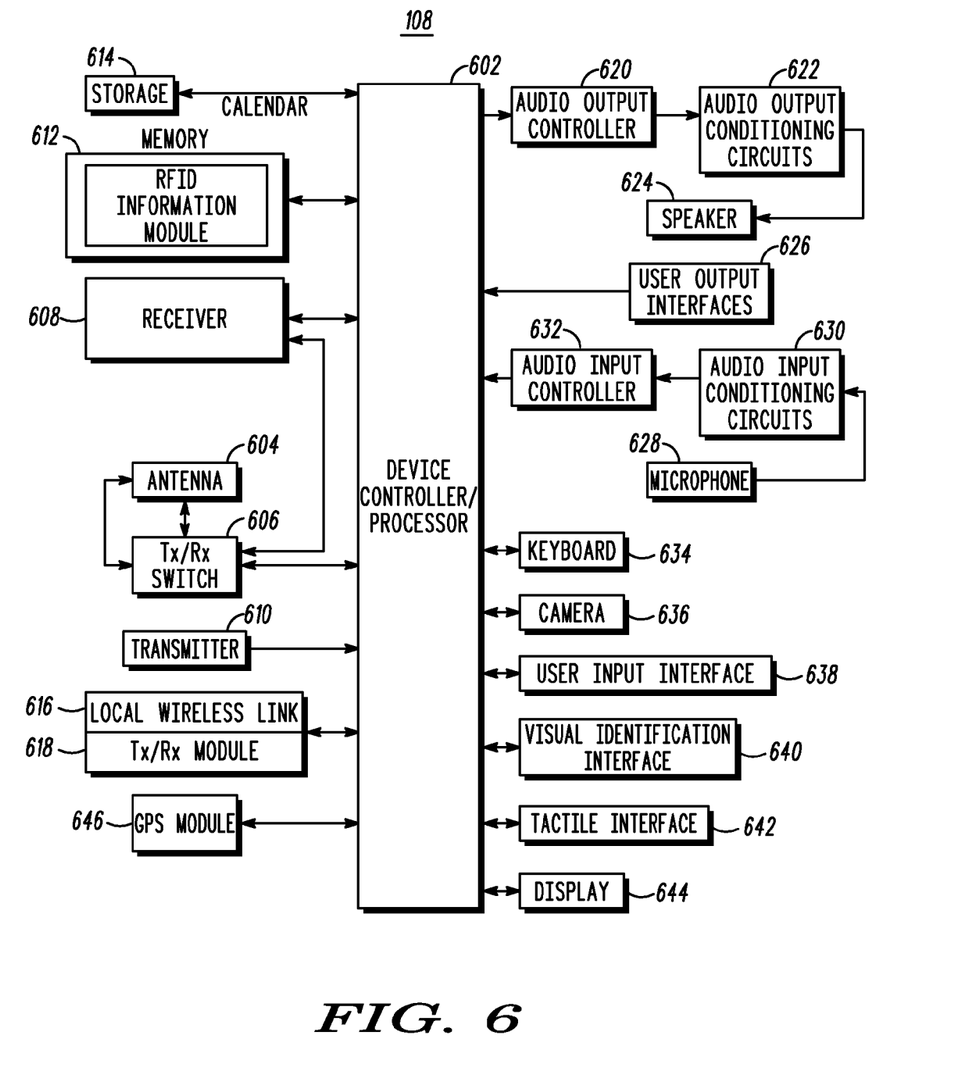
FIG. 6 is a block diagram illustrating a wireless communication device according to an embodiment of the present invention.

FIG. 6 is a block diagram illustrating a detailed view of the wireless device 108 according to an embodiment of the present invention. The wireless communication device can either be a single mode or dual mode phone (i.e., can communicate either on a circuit services network or a packet data network). The wireless device 108 operates under the control of a device controller/processor 602, that controls the sending and receiving of wireless communication signals. In receive mode, the device controller 602 electrically couples an antenna 604 through a transmit/receive switch 606 to a receiver 608. The receiver 608 decodes the received signals and provides those decoded signals to the device controller 602.

In transmit mode, the device controller 602 electrically couples the antenna 604, through the transmit/receive switch 606, to a transmitter 610. The device controller 602 operates the transmitter and receiver according to instructions stored in the memory 612. These instructions include, for example, a neighbor cell measurement-scheduling algorithm. The memory 612 also includes the RFID information module 130, which includes the RFID information receiver 136 and the GUI 132 as shown in FIG. 1. The memory 612 can also include an activity profile database as shown in FIG. 1. As discussed above, the RFID information receiver 136 receives information from the RFID reader 102 associated with RFID enabled items 110 or activity profiles 126. In one embodiment, the receiver 608 and the transmitter 610 are also capable of communicating with an RFID reader 102 for communicating and receiving RFID enabled item information, activity profiles, and the like. For example, the receiver 608 and the transmitter 610 can receive and send 802.11, 802.16 communications.

The GUI 132 allows a user to interact with an RFID reader 102, create activity profiles 126, and visually display RFID enabled item information via the display 644. The main memory 612, in one embodiment, also includes one or more activity profiles 126. Although shown as residing in the memory 612, one or more of these components can be implemented as hardware within the wireless device 108. The wireless device 108, also includes non-volatile storage memory 614 for storing, for example, an application waiting to be executed (not shown) on the wireless device 108.

The wireless device 108, in this example, also includes a local wireless link 616 that allows the wireless device 108 to directly communicate with another wireless device without using a wireless network (not shown). The local wireless link 616, for example, is provided by Bluetooth, Infrared Data Access (IrDA) technologies, or the like. The local wireless link 616 also includes a local wireless link transmit/receive module 618 that allows the wireless device 108 to directly communicate with another wireless communication device such as wireless communication devices communicatively coupled to personal computers, workstations, and the like. The local wireless link 616, in one embodiment, also allows the wireless device 108 to communicate with an RFID reader 102 for communicating and receiving RFID enabled item information, activity profiles, and the like The wireless device 108 of FIG. 6 further includes an audio output controller 620 that receives decoded audio output signals from the receiver 608 or the local wireless link transmit/receive module 618. The audio controller 620 sends the received decoded audio signals to the audio output conditioning circuits 622 that perform various conditioning functions. For example, the audio output conditioning circuits 622 may reduce noise or amplify the signal. A speaker 624 receives the conditioned audio signals and allows audio output for listening by a user. The audio output controller 620, audio output conditioning circuits 622, and the speaker 624 also allow for an audible alert to be generated notifying the user of a missed call, received messages, or the like. The wireless device 108 further includes additional user output interfaces 626, for example, a head phone jack (not shown) or a hands-free speaker (not shown).

The wireless device 108 also includes a microphone 628 for allowing a user to input audio signals into the wireless device 108. Sound waves are received by the microphone 628 and are converted into an electrical audio signal. Audio input conditioning circuits 630 receive the audio signal and perform various conditioning functions on the audio signal, for example, noise reduction. An audio input controller 632 receives the conditioned audio signal and sends a representation of the audio signal to the device controller 602.

The wireless device 108 also comprises a keyboard 634 for allowing a user to enter information into the wireless device 108. The wireless device 108 further comprises a camera 636 for allowing a user to capture still images or video images into memory 612. Furthermore, the wireless device 108 includes additional user input interfaces 638, for example, touch screen technology (not shown), a joystick (not shown), or a scroll wheel (not shown). In one embodiment, a peripheral interface (not shown) is also included for allowing the connection of a data cable to the wireless device 108. In one embodiment of the present invention, the connection of a data cable allows the wireless device 108 to be connected to a computer or a printer.

A visual notification (or indication) interface 640 is also included on the wireless device 108 for rendering a visual notification (or visual indication), for example, a sequence of colored lights on the display 644 or flashing one ore more LEDs (not shown), to the user of the wireless device 108. For example, a received multimedia message may include a sequence of colored lights to be displayed to the user as part of the message. Alternatively, the visual notification interface 640 can be used as an alert by displaying a sequence of colored lights or a single flashing light on the display 644 or LEDs (not shown) when the wireless communication device 104 receives a message, or the user missed a call.

The wireless device 108 also includes a tactile interface 642 for delivering a vibrating media component, tactile alert, or the like. For example, a multimedia message received by the wireless device 108, may include a video media component that provides a vibration during playback of the multimedia message. The tactile interface 642, in one embodiment, is used during a silent mode of the wireless device 108 to alert the user of an incoming call or message, missed call, or the like. The tactile interface 642 allows this vibration to occur, for example, through a vibrating motor or the like.

The wireless device 108 also includes a display 640 for displaying information to the user of the wireless communication device 104 and an optional Global Positioning System (GPS) module 646. The optional GPS module 346 determines the location and/or velocity information of the wireless device 108. This module 646 uses the GPS satellite system to determine the location and/or velocity of the wireless device 108. Alternative to the GPS module 646, the wireless device 108 may include alternative modules for determining the location and/or velocity of wireless device 108, for example, using cell tower triangulation and assisted GPS.

Exemplary RFID Reader

Figure 7:
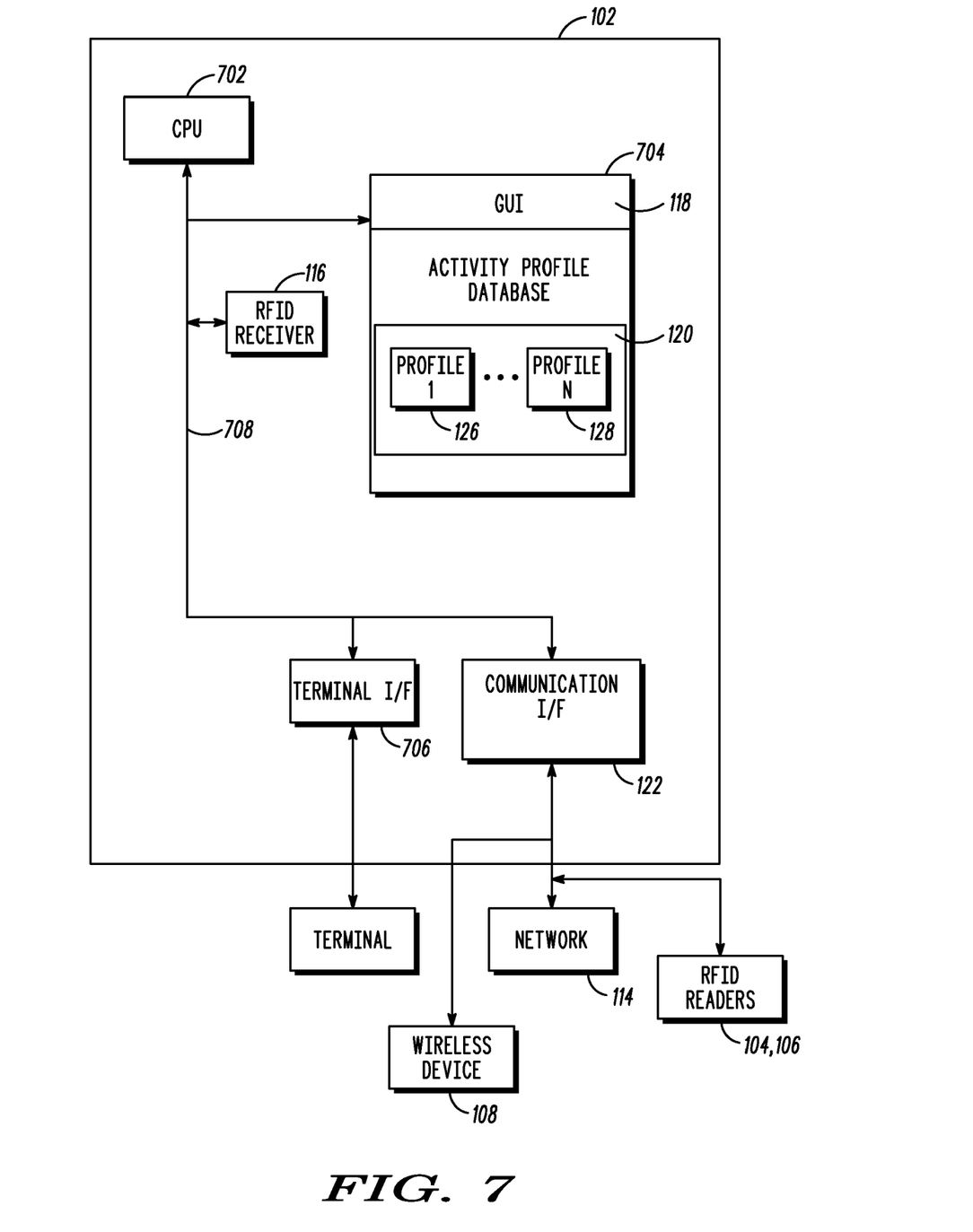
FIG. 7 is a block diagram illustrating a information processing system according to an embodiment of the present invention.

FIG. 7 is a block diagram illustrating a detailed view of the RFID reader 102 according to an embodiment of the present invention. The RFID reader 102 includes a processor 702 that is communicatively connected to a main memory 704 (e.g., volatile memory), a terminal interface 706, the communication interface 122, and the RFID receiver 116. A system bus 708 interconnects these system components. The main memory 704, in one embodiment, includes portions of the RFID monitoring module 124 such as the 118. As discussed above, the RFID receiver 116 comprises part of the RFID monitoring module 124 and detects the presence of RFID enabled items 110.

The GUI 118 allows for a user to interact with the RFID reader 102. For example, a user can be notified of detected/missing RFID enabled items; a user can create activity policies 126; make various selections; and the like through the GUI 118. The GUI is communicatively coupled to display hardware (not shown). It should be noted that the RFID reader 102 does not need to include a display or the GUI 118. The main memory 704, in one example, also includes an activity profile database 120 for storing one or more activity profiles 126, as discussed above. Although shown as residing in the memory 706, one or more of these components can be implemented as hardware within the RFID reader 102.

Terminal interface 706 is used to directly connect one or more devices such as an information processing system to the RFID reader 102. The communication interface 122 provides a communication mechanism between other RFID readers 104, 106, the wireless device 108, and the network 114. The communication interface 122 can be wired and/or wireless comprising Ethernet, 802.11, 802.16, Bluetooth, IrDA, or the like. Embodiments of the present invention are able to be adapted to work with any data communications connections including present day analog and/or digital techniques or via a future networking mechanism.

It should be noted that a user can designate one or more RFID readers 102 in a set of RFID readers to monitor for certain items or activities. For example, an RFID reader 102 in a trunk of a car can be assigned to monitor for RFID enabled items associated with a "camping" activity, while an RFID reader at a front door of a hose can be assigned to a "leave for work" activity. Also, one or more RFID readers 102 can be communicatively coupled to one another, thereby creating an RFID reader network. These RFID readers 102 can then pass information to one another.

Process of Detecting an RFID Enabled Item

Figure 8:
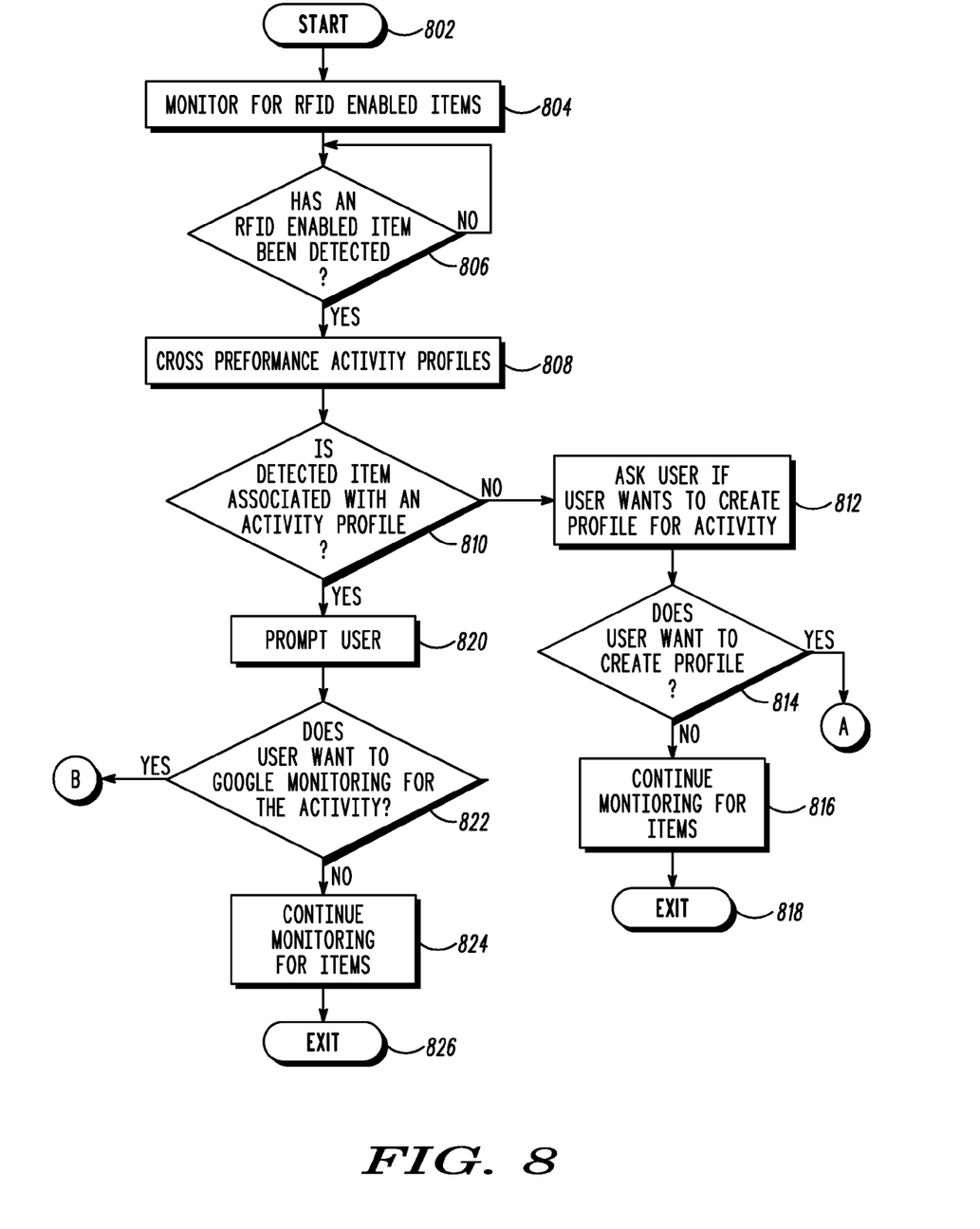
FIG. 8 is an operational flow diagram illustrating a process detecting an RFID enabled item according to an embodiment of the present invention.

FIG. 8 is an operational flow diagram illustrating a process of detecting RFID enabled items 110. The operational flow diagram of FIG. 8 begins at step 802 and flows directly to step 804. The RFID reader 102, at step 804, monitors for an RFID enabled item 110. In one example, the RFID reader 102 is powered on and is continuously monitoring for RFID enabled items 110. The RFID reader 102, at step 806, determines if an RFID reader 102 has been detected. If the result of this determination negative, the RFID reader 102 continues monitoring. If the result of this determination is positive, the RFID reader 102 cross-references, at step 808, its activity profile database 120 to determine, at step 810, if the detected item 110 is associated with an activity profile 126.

If the result of this determination is negative, the RFID reader 102, at step 812, prompts the user to determine, at step 814, if the user wants to create an activity profile 126 for this item or associate the item with an already existing profile. If the result of this determination is positive, the control flows to entry point A of FIG. 9. If the result of this determination is negative, the RFID reader 102, at step 816, continues to monitor for RFID enabled items 110. The control flow exits at step 818. 102. If the result at step 810 is positive, the user, at step 820, is prompted to determine, at step 822, if the user wants to begin monitoring for items associated with the activity. If the result of this determination is negative, the RFID reader 102, at step 824, continues monitoring for RFID enabled items 110. The control flow exits at step 826. If the result of this determination is positive, the control flows to entry point B of FIG. 10.

Process for Creating an Activity Profile

Figure 9:
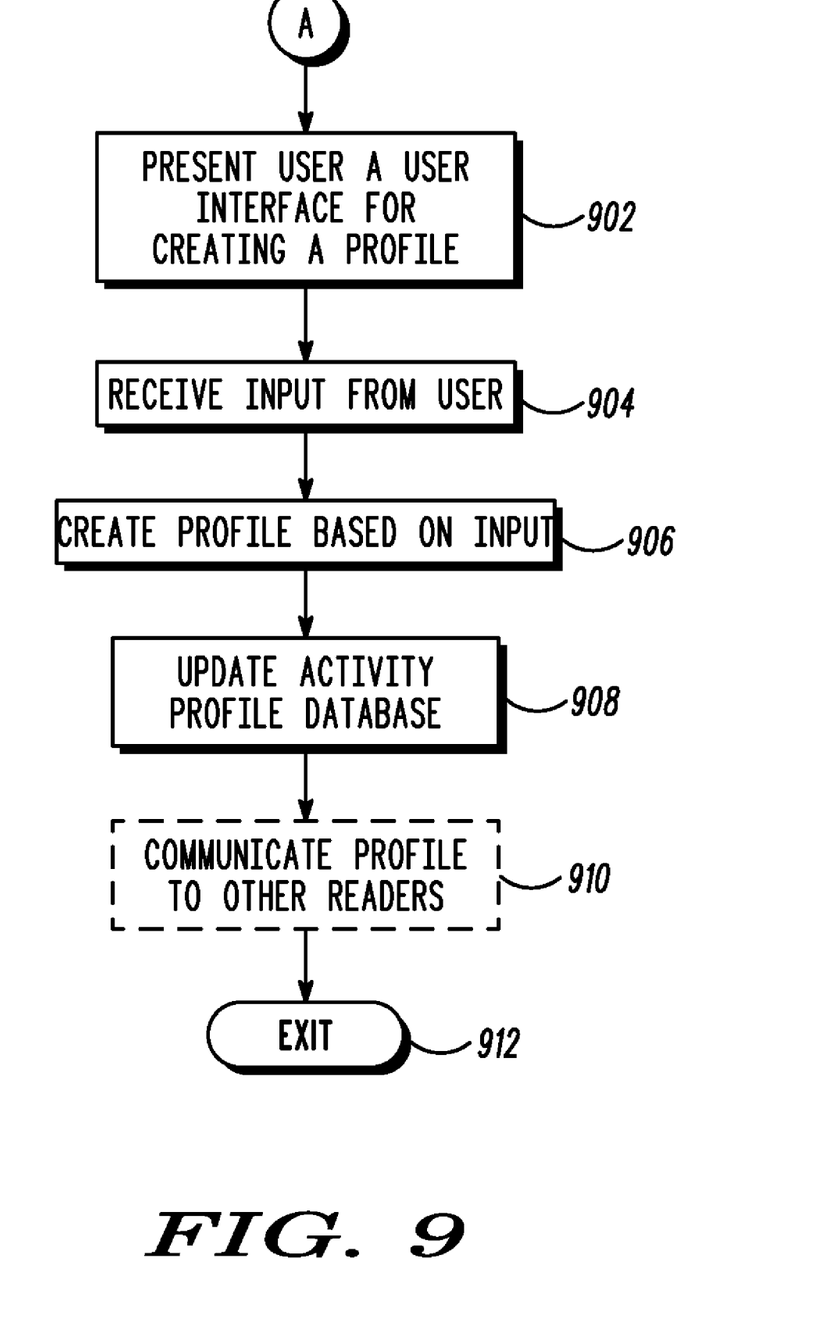
FIG. 9 is an operational flow diagram illustrating a process creating an activity profile according to an embodiment of the present invention.

FIG. 9 is an operational flow diagram illustrating a process creating an activity profile 126. The operational flow diagram of FIG. 9 begins at step 902 and flows directly to step 904. It should be noted even though the following process is discussed with respect to the RFID reader 102, it can also performed on the wireless device 108. The RFID reader 102, at step 902, presents a user interface to the user for creating an activity profile 126. The RFID reader 102, at step 904, receives the user input. For example, the user can enter text directly into the RFID reader 102. Also, the RFID read 102 can also include speech recognition technology for capturing information spoken by a user.

The RFID reader 102, at step 906, creates an activity profile 126 based on the entered information. The RFID reader 102, at step 908, updates the activity profile database 120 to include the new activity profile 126. The RFID reader 102, at step 910, can optionally communicate the new activity profile 126 to other RFID readers or the wireless device 108. The control flow exits at step 910.

Process of Monitoring RFID Enabled Items Based on an Activity Profile

Figure 10:
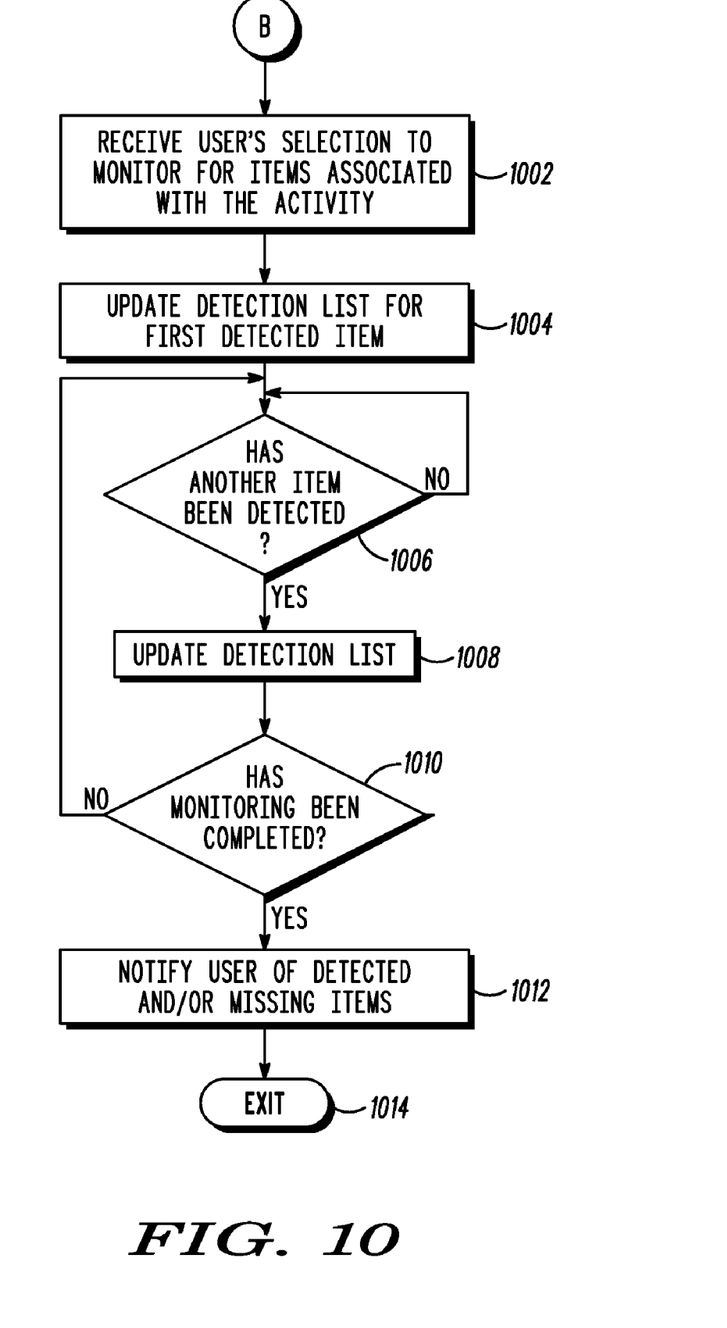
FIG. 10 is an operational flow diagram illustrating another a process of monitoring for RFID enabled items based on activity profiles according to an embodiment of the present invention.

FIG. 10 is an operational flow diagram illustrating a process of monitoring RFID enabled items 110 based on an activity profile. The operational flow diagram of FIG. 10 begins at step 1002 and flows directly to step 1004. The RFID reader 102, at step 1002, receives a user's selection for monitoring items associated with an activity.

A detection list, at step 1004, is updated to include the first detected item. The RFID reader 102, at step 1006, determines if another item has been detected. If the result of this determination is negative, the RFID reader 102 continues to monitor for items. If the result of this determination is positive, the RFID reader 102, at step 1008, updates the detection list is update to include the newly detected item. The RFID reader 102, at step 1010, determines if the monitoring has been completed. For example, the RFID reader 102 can determine that the last item in the activity profile has been detected. Also, a user can manually stop the monitoring. The RFID reader 102 can also stop the monitoring if after a given period of time no items have been detected.

If the result of this determination is negative, the RFID reader 102 continues to determine if new items have been detected. If the result of this determination is positive, the RFID reader 102, at step 1012 notifies the user detected and/or missing items. It should be noted that a list of detected/missing items can be dynamically displayed to a user through the monitoring process. Also, the list can be displayed at the RFID reader 102 or on the wireless device 108. The RFID reader 102 can also update the list on the wireless device and display the list on other RFID readers.

Process of Determining when to Monitor for RFID Enabled Items

Figure 11:
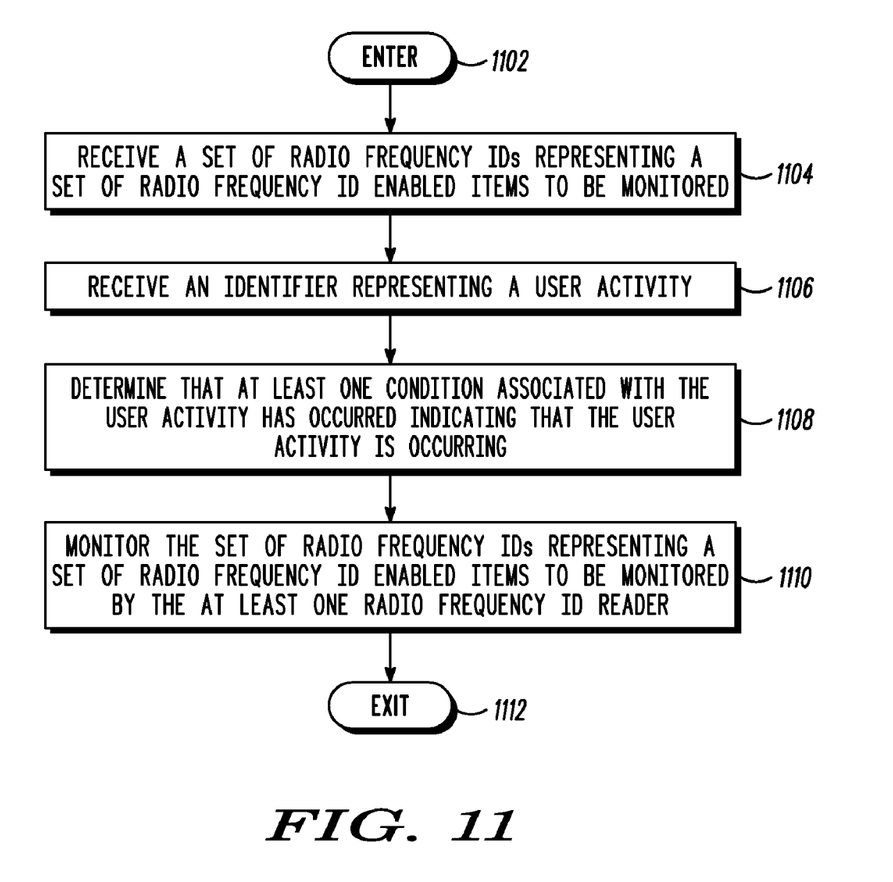
FIG. 11 is an operational flow diagram illustrating a process of determining when to monitor for RFID enabled items according to an embodiment of the present invention.

FIG. 11 is an operational flow diagram illustrating a process of determining when to monitor for RFID enabled items 110. The operational flow diagram of FIG. 11 begins at step 1102 and flows directly to step 1104. The RFID reader 102, at step 1104, receives a set of radio frequency IDs representing a set of radio frequency ID enabled items 110 to be monitored. The RFID reader 102, at step 1106, receives and identifier representing a user activity. The identifier also represents the user activity's relationship with at least one radio frequency ID in the set of radio frequency IDs and at least one radio frequency ID reader.

The RFID reader 102, at step 1108, determines that at least one condition associated with the user activity has occurred, which indicates that the user activity is occurring. The RFID reader 102, at step 1110, monitors the set of radio frequency IDs, which represents a set of radio frequency ID enabled items to be monitored by the at least one radio frequency ID reader in response to the determining that the at least one condition is occurring. The control flow then exits at step 1112.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method, with an electronic device, for monitoring radio-frequency identification enabled items, the method comprising:
    executing on an information processing system the following:
    receiving a set of radio frequency IDs representing a set of radio frequency ID enabled items to be monitored;
    receiving a plurality of identifiers respectively representing a plurality of user activity profiles, wherein at least one of the user activity profiles is associated with a plurality of radio frequency IDs in the set of radio frequency IDs, the at least one of the user activity profiles comprising a set of identifiers identifying one or more radio frequency ID readers in a set of radio frequency ID readers to monitor the plurality of radio frequency IDs when the at least one of the user activity profiles is selected;
    determining that the at least one of the user activity profiles has been selected; and
    initiating, in response to the determining, only the one or more radio frequency ID readers to monitor for one or more radio frequency enabled items corresponding to the plurality of radio frequency IDs associated with the at least one of the user activity profiles.

2. The computer implemented method of claim 1, further comprising:
    determining, in response to initiating only the one or more radio frequency ID readers to monitor for the plurality of radio frequency IDs, if a presence of at least one radio frequency enabled item of the one or more radio frequency enabled items is detected by detecting radio frequency identification; and
    notifying, in response to the determining if the presence of the at least one radio frequency enabled item is detected, a user of a presence status associated with the at least one radio frequency enabled item.

3. The computer implemented method of claim 1, further comprising:
sending the set of radio frequency IDs to at least one of the one or more radio frequency ID readers and a wireless communication device.

4. The computer implemented method of claim 1, further comprising:
sending the identifier representing the user activity to at least one of the one or more radio frequency ID readers and a wireless communication device.

5. The computer implemented method of claim 2, wherein the notifying further includes:
displaying the presence status associated with the at least one radio frequency enabled item via a graphical user interface on the electronic device.

6. The computer implemented method of claim 2, wherein the notifying further includes:
emitting audio from at least one of the one or more radio frequency ID readers and the wireless communication device, wherein the audio represents the presence status associated with the at least one radio frequency enabled item.

7. The computer implemented method of claim 2, wherein the notifying further includes:
wirelessly sending the presence status associated with the at least one item to a wireless device associated with the user, wherein the presence status is displayed to the user via a graphical user interface on the wireless device.

8. A wireless device for monitoring radio-frequency identification enabled items, the wireless device comprising:
a memory;
a processor communicatively coupled to the memory; and
a radio frequency ID monitoring module communicatively coupled to the memory and the processor, wherein the radio frequency ID monitoring module is for:
receiving a set of radio frequency IDs representing a set of radio frequency ID enabled items to be monitored;
receiving a plurality of identifiers respectively representing a plurality of user activity profiles, wherein at least one of the user activity profiles is associated with a plurality of radio frequency IDs in the set of radio frequency IDs and identifies one or more radio frequency ID readers in a set of radio frequency ID readers to monitor the plurality of radio frequency IDs when the at least one of the user activity profiles is selected;
detecting a radio frequency ID enabled item in the set of radio frequency ID enabled items;
identifying, based on the detecting, a user activity profile from the plurality of user activity profiles, that is associated with the radio frequency ID enabled item that has been detected, wherein the user activity profile is associated with a set of remaining radio frequency ID enabled items to be monitored for;
selecting the user activity profile as a current monitored user activity profile in response to the radio frequency ID enabled item being detected and the user activity profile being identified; and
initiating, based on the user activity profile being selected, only the one or more radio frequency ID readers identified by the user activity profile that has been selected to monitor the set of remaining radio frequency ID enabled items.

9. The wireless device of claim 8, further comprising:
determining, in response to the initiating, if a presence of at least one item in the set of radio frequency ID enabled items is detected by detecting radio frequency identification; and
notifying, in response to the determining if the presence of the at least one item in the of radio frequency ID enabled items is detected, a user of a presence status associated with the at least one item.

10. The wireless device of claim 8, further comprising:
sending the set of radio frequency IDs to at least one of the radio frequency ID reader and a wireless communication device.

11. The wireless device of claim 8, further comprising:
sending the identifier representing the user activity to at least one of the one or more radio frequency ID readers and a wireless communication device.

12. The wireless device of claim 9, wherein the notifying further includes:
displaying the presence status associated with the at least one item via a graphical user interface on the electronic device.

13. The wireless device of claim 9, wherein the notifying further includes:
emitting audio from at least one of the one or more radio frequency ID readers and the wireless communication device, wherein the audio represents the presence status associated with the at least one item.

14. The wireless device of claim 9, wherein the notifying further includes:
displaying the presence status is to the user via a graphical user interface.

15. The computer implemented method of claim 1, wherein the initiating further comprises:
determining if at least one condition associated with the user activity has occurred indicating that the user activity is occurring; and
initiating, in response to the determining that the at least one condition has occurred, only the one or more radio frequency ID readers to monitor for one or more radio frequency enabled items corresponding to the plurality of radio frequency IDs associated with the at least one of the user activity profiles.

16. The computer implemented method of claim 1, wherein initiating monitoring further comprises:
detecting, in response to the initiating, at least one radio frequency enable item;
prompting the user that the radio frequency ID enabled item has been detected;
displaying, in response to the prompting, to the user the user activity profile that has been selected;
receiving, from the user, an indication to initiate monitoring of a set of remaining radio frequency ID enabled items associated with the user activity profile; and
initiating only the one or more radio frequency ID readers to monitor for the set of remaining radio frequency ID enabled items in response to receiving the indication from the user.

17. A computer implemented method, with an electronic device, for monitoring radio-frequency identification enabled items, the computer implemented method comprising:
executing on an information processing system the following:
receiving a set of radio frequency IDs representing a set of radio frequency ID enabled items to be monitored;
receiving a set of radio frequency ID reader identifiers, wherein each radio frequency ID reader identifier is associated with a radio frequency ID reader in a plurality of radio frequency ID readers;

receiving a first identifier representing a user activity and its relationship with at least one radio frequency ID in the set of radio frequency IDs;

receiving a second identifier representing the user activity and its relationship with a given set of radio frequency ID readers in the plurality of radio frequency ID readers;

determining if at least one condition associated with the user activity has occurred indicating that the user activity is occurring;

selecting, based on determining that one condition associated with the user activity has occurred, only the given set of radio frequency ID readers to monitor for the at least one radio frequency ID representing at least one radio frequency ID enabled item; and monitoring, in response to selecting the only the given set of radio frequency ID readers, for the at least one radio frequency ID representing at least one radio frequency ID enabled item.

18. The computer implemented method of claim 17, further comprising:

determining, in response to the monitoring, if a presence of the at least one item is detected by detecting radio frequency identification; and notifying, in response to the determining the presence of the at least one item is detected, a user of a presence status associated with the at least one item.

19. The computer implemented method of claim 18, wherein the notifying further includes:

displaying the presence status associated with the at least one item via a graphical user interface on the electronic device.

20. The computer implemented method of claim 18, wherein the notifying further includes:

wirelessly sending the presence status associated with the at least one item to a wireless device associated with the user, wherein the presence status is displayed to the user via a graphical user interface on the wireless device.

* * * * *